United States Patent [19]

Kappenberger

[11] Patent Number: 4,925,558

[45] Date of Patent: May 15, 1990

[54] PROCESS FOR THE FURTHER PROCESSING OF THE VACUUM DISTILLATION RESIDUE IN A CRUDE OIL REFINERY

[75] Inventor: Peter Kappenberger, Zurich, Switzerland

[73] Assignee: Buss A.G., Switzerland

[21] Appl. No.: 74,360

[22] Filed: Jul. 16, 1987

[30] Foreign Application Priority Data

Jul. 23, 1986 [CH] Switzerland ............. 02954/86

[51] Int. Cl.$^5$ ............................................. B01D 3/12
[52] U.S. Cl. ................................. 208/361; 208/366; 208/48 R; 202/236
[58] Field of Search .......... 208/48 R, 360, 361, 208/352, 366, 357; 196/120; 202/236; 203/72, 89

[56] References Cited

U.S. PATENT DOCUMENTS

4,517,057  5/1985  Fauser et al. ................. 202/236

FOREIGN PATENT DOCUMENTS

0066790  8/1985  European Pat. Off. .
0189610  8/1986  European Pat. Off. .
3122650  12/1982  Fed. Rep. of Germany .

*Primary Examiner*—Glenn Caldarola
*Attorney, Agent, or Firm*—Michael N. Meller

[57] ABSTRACT

The residue or residue fraction left behind during vacuum distillation in a crude oil refinery is further processed, in that it undergoes thin-film short-path distillation at a higher temperature and under a fine vacuum. Raising the temperature leads to a rise in the feed rate and to an improvement in the distillate/residue ratio.

17 Claims, 2 Drawing Sheets

PROCESS FOR THE FURTHER PROCESSING OF THE VACUUM DISTILLATION RESIDUE IN A CRUDE OIL REFINERY

BACKGROUND OF THE INVENTION

The present invention relates to a new and improved process for the further processing of the residue left behind in a crude oil refinery following vacuum distillation.

Following the final stage, performed under vacuum, of the fractionation distillation of crude oil in the refinery, those substances which do not volatilize up to approximately 550° C. (normal pressure) are left behind in the distillation residue. As a function of the origin of the crude oil, this distillation residue generally corresponds to 25% of the crude oil infeed or feed. In practice, its further processing can take place by solvent treatment, e.g. by deasphalting by means of propane. As a result the residue is separated into a first fraction containing lubricating oils and waxes soluble in the solvent and a second fraction containing asphalts, asphaltenes, and so forth which are insoluble in the solvent. A larger quantity of the second fraction is obtained. Valuable nonfuels such as lubricating oils and waxes can be obtained from the first solution fraction, or they can be supplied to a cracker or cracking device for the recovery of low-boiling products. The second fraction or precipitate insoluble in the solvent is either used for bitumen production or in situ as a fuel for the refinery or, after admixing a lighter fraction for liquefaction purposes, as a heavier fuel outside the refinery, e.g. for power stations.

Various disadvantages and restrictions are inherent in processing the vacuum distillation residue or residue fraction by means of solvents. The lower-grade asphalt-containing fraction left behind in insoluble form after solvent treatment often corresponds to more than half the vacuum residue, which in the case of heavy crude oils can represent 40% or more of the crude oil. Such a large proportion exceeds the fuel requirements of the refinery. In connection with the second possible use of the insoluble fraction, i.e. bitumen production, problems also occur, because the asphalts and asphaltenes present in colloidal form in the crude oil are precipitated during solvent treatment. However, the indispensable complete redispersion necessary for bitumen production is often no longer possible, so that a low-grade product is obtained.

In addition, the solvent treatment does not completely dissolve the lubricating oil and wax fraction and instead high molecular components are dissolved and introduced into the first fraction which is disadvantageous for the end products obtained, e.g. leads to increased coking of the lubricating oils obtained therefrom.

Additionally, the use of low-boiling solvents calls for special safety measures and in particular expensive equipment. The recovery of the solvent is energy-consuming and due to the high solvent/residue ratio also costly.

European Patent No. 0,066,790, published Aug. 21, 1985, describes a process for the turbulent-film short-path vacuum distillation of the residue or residue fraction from an oil or petroleum refinery. Both the evaporation or vaporizing pressure and the temperature of the condensation surfaces decrease from infeed to residue removal. In order to improve the energy balance, the residue from vacuum distillation is fed to the short-path distillation process without any supply of energy, so that the heat of evaporation or vaporization of the feed, which has the residue temperature of the vacuum distillation residue, is removed, which necessarily leads to cooling and consequently to lower temperatures during short-path distillation than in the preceding vacuum distillation.

According to German Patent Publication No. 3,122,650, published Dec. 12, 1982, use is made of thin-film short-path vacuum distillation within an oil refinery, so that the crackable fraction or component yield is increased. Mechanical means like wipers are used to product a turbulent thin film. At the same time there is no need for accomplishing the conventional solvent extraction. The distillation temperature can be considerably lowered by lowering the operating pressure, which permits a careful distillation of fractions having a high atmospheric boiling point. The residue from the vacuum distillation preceding the short-path distillation is used for heating purposes, from which residue there is removed the heat of evaporation or vaporization, so that short-path distillation takes place at a temperature lower than that of the preceding vacuum distillation.

SUMMARY OF THE INVENTION

Therefore with the foregoing in mind, it is a primary object of the present invention to provide an improved process for the further processing of the vacuum distillation residue in a crude oil refinery in a manner which is not afflicted with the afore-discussed shortcomings and drawbacks of the prior art.

Another more specific and important object of the present invention is to provide an improved process for the short-path distillation of the residue from the vacuum distillation (there not being encompassed molecular distillation) of crude oil, which is more economic than the heretofore described processes.

It has surprisingly been found that through increasing the energy expenditure, it is possible to significantly improve the economics of thin-film, short-path distillation of the residue or residue fraction from vacuum distillation, i.e. an economic improvement results from an inferior energy balance. According to the invention, the increase in the energy expenditure is brought about by raising the temperature of the short-path distillation compared with the temperature of the preceding vacuum distillation. This leads to a considerable increase in the feed rate and therefore the distillation capacity, this taking place with a simultaneous increase in the distillation fraction and a decrease in the less valuable residue or residue fraction.

According to the prior art extraction process, separation took place with an apolar solvent based on the polarity, i.e. the chemical structure of the substances. With the known short-path distillation processes, the vacuum residue is separated on the basis of the boiling point of the substances present. According to the invention as a result of the high temperature valuable products are obtained with the distillate or distillate fraction, which would have been left behind in the lower-grade residue by the prior art. Thus, the invention not only leads to a quantitative advantage as a result of the larger amount of more valuable product, but also to a different composition of the fractions and consequently further qualitative advantages.

Of greater importance than the improvement in the distillate/residue ratio is the fact that it is possible to increase several times the feed rate per unit of time and per unit of area of the evaporator or vaporizer surface as a result of the higher temperature. This leads to an extraordinary improvement in the economic performance of the process.

The inventive process also leads to a significant increase in the difference between the so-called C/H ratio, i.e. the ratio of carbon to hydrogen, between the distillate or distillate fraction and the residue or residue fraction.

The invention also ensures a much shorter residence time with very limited dispersion, i.e. great uniformity. Simultaneously the elevated temperature permits a problem-free removal of the high molecular substance-enriched residue.

The inventively obtained lubricating oils can, without additives, be used in the same way as lubricating oils obtained according to conventional vacuum distillation processes and set to the desired viscosity by using costly additives. The distillate is also substantially free from metal-containing components, so that no problems are encountered when cracking with impurity-sensitive catalysts for producing low-boiling substances. According to the invention the polyaromatics remain in the residue, which additionally improves the distillate quality and stabilizes the colloidal asphaltenes in the residue.

The asphalt-containing fraction, i.e. the residue or residue fraction of the thin-film short-path distillation, compared with the prior art, is not only quantitatively reduced in such a way that its complete use as a fuel in the refinery is possible, but is also qualitatively modified in that it can be readily re-dispersed during bitumen production. This characteristic can inter alia be linked with an increased polar component content. It is also important in the case of crude oils having a high wax content, particularly for the bitumen/asphalt use, that the residue or residue fraction substantially no longer has a wax content.

Thin-film short-path distillation or its apparatus realization or design is known in process engineering and was mainly used for the careful recovery/purification of heat-sensitive substances, so as to avoid the thermal decomposition thereof. However, according to the invention, thermal decomposition is desired, because this makes it possible to obtain a larger amount of the desired, more valuable distillate or distillate fraction and is possible to a limited extent for as long as the vacuum is maintained.

The process according to the invention makes it possible to distill, accompanied by quantitative and qualitative advantages, the heretofore last, not further distillable distillation residue or residue fraction in the oil refinery, which boils at above approximately 550° C. (at normal pressure). This leads to products with a novel composition and with in part novel characteristics.

The invention also makes it possible to recover from heavy crude oils, which have approximately 50% or even more vacuum distillation residue and which are therefore scarcely commercially usable, distillates in quantities as obtained with conventional crude oils, so that such distillates can also be used.

The inventive process can be performed with known thin-film short path distillation equipment located following the final refinery stage, i.e. vacuum distilation. The temperatures during thin-film short-path distillation are higher and the pressure is approximately lower by a factor of $10^{-1}$ to $10^{-3}$ than in the preceding vacuum distillation. Working or processing takes place with a rising temperature course or pattern according to a particular embodiment of the invention. The volatilization and condensation surfaces should be as close together as possible for the vacuum which is provided, where large volumes of vapor are produced. This is generally achieved by coaxial volatilization and condensation areas. Advantageously, the volatilization and condensation surfaces are cylindrically vertically arranged. The material fed in is uniformly distributed over the upper part of the heating surface and brought into a turbulent state, which is maintained until the material leaves the heating surface by the action of gravity at the bottom. Material warmed on the complete heating surface is immediately supplied to the liquid surface and volatilizes the lower boiling fraction.

Several thin-film short-path apparatuses can be arranged in series or in parallel.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
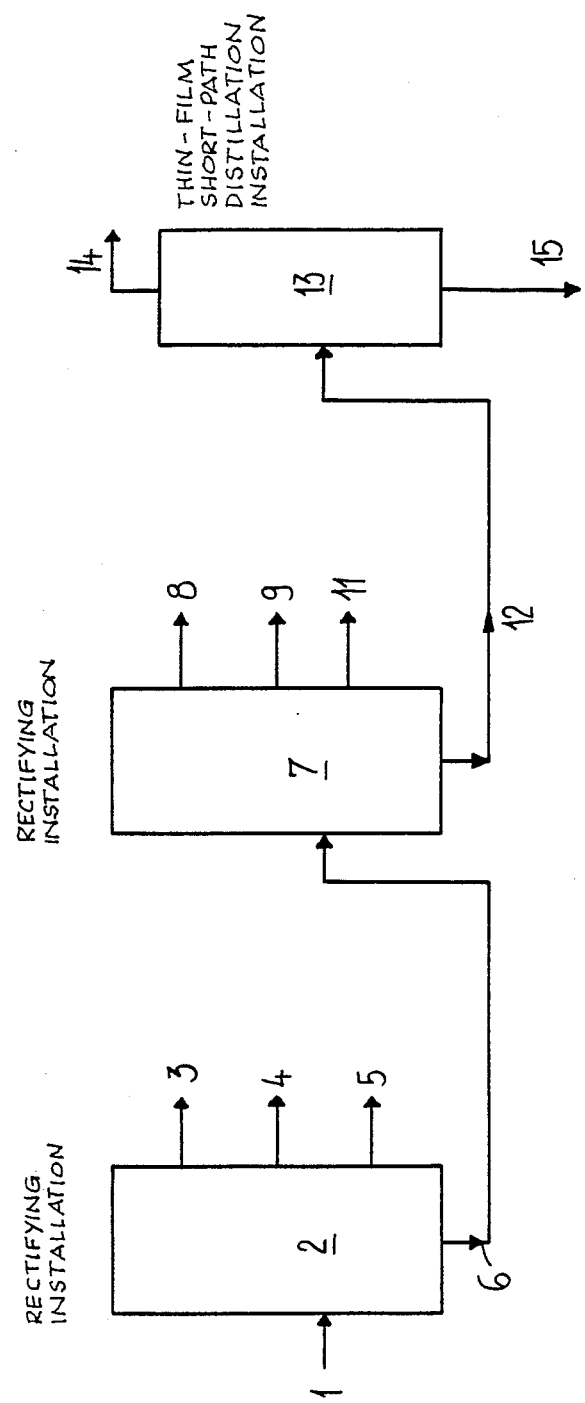
FIG. 1 shows a simplified flow diagram of the distillation path of a crude oil refinery.
Figure 2:
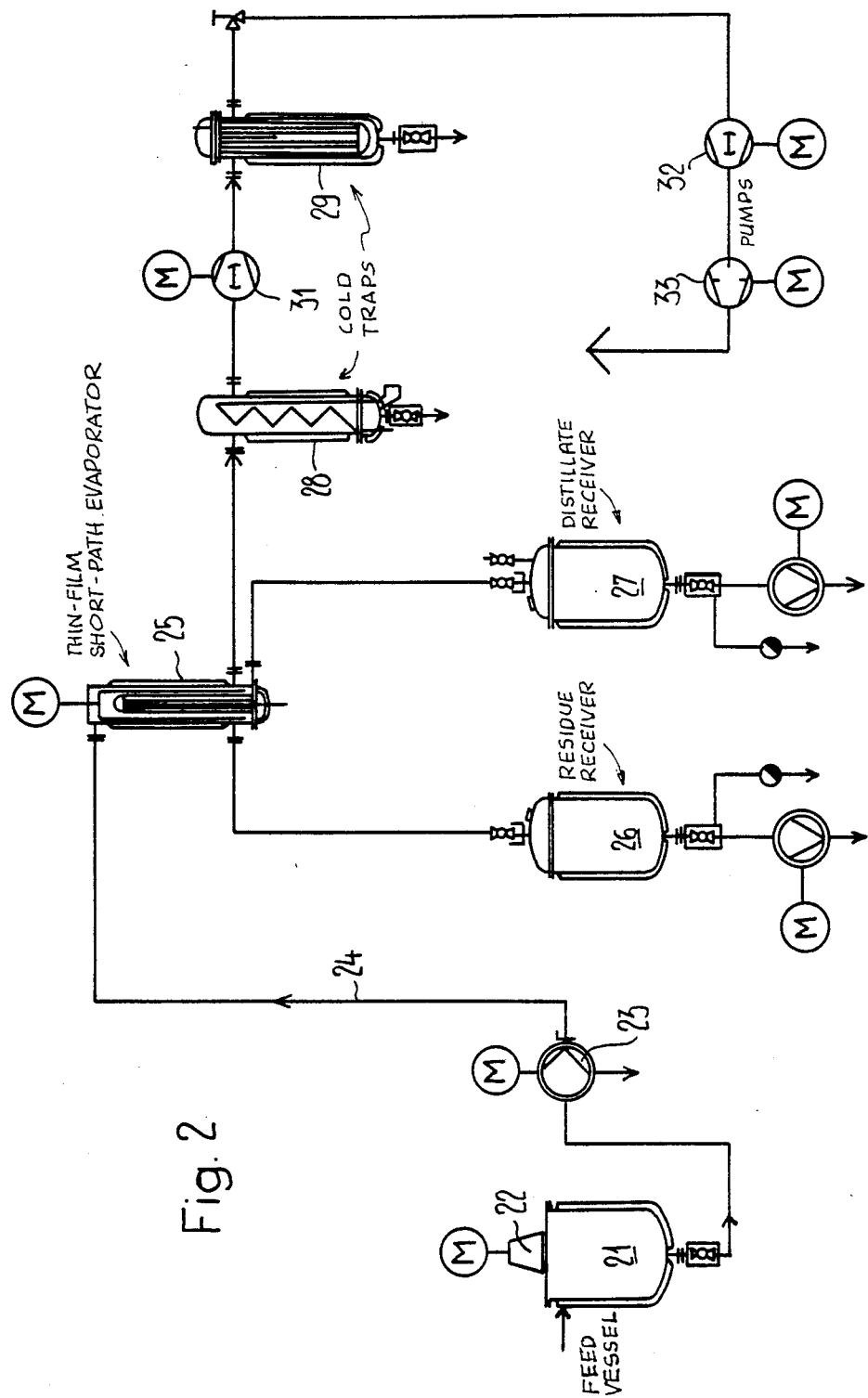
FIG. 2 shows a plant or installation for performing the process according to the invention.

Describing now the drawings, an average quality crude oil 1 is supplied to a rectifying installation or plant 2 operating at normal pressure. Following volatilization, approximately 50% of the fed in crude oil leave the rectifying installation or plant 2 in the form of separate fractions 3, 4, 5. Residue or residue fraction 6 is supplied to another rectifying installation or plant 7, operating under vacuum and approximately 25% of the crude oil leave it as fractions 8, 9 and 11. The undistillable residue or residue fraction 12 is now supplied to the inventive further treatment, i.e. the thin-film short-path distillation in the thin-film short-path distillation installation or plant 13. A distillate or distillate fraction 14 and the undistillable residue or residue fraction 15 are there obtained. Distillate 14 can either be supplied to a cracker or cracking device or installation for recovering low molecular products or can be further separated into lubricating oil and wax. The residue or residue fraction 15 is used as fuel in the refinery or is further processed to tar The plant or installation depicted in FIG. 2 for performing the inventive process has a feed vessel 21 with an agitator or stirrer 22 or the like. Throughout the drawings, the motors belonging to the individual devices or facilities are conveniently designated by reference character M. Feed vessel 21 is connected by means of a line or conduit 24 having a feed pump 23 to a thin-film short-path evaporator or vaporizer 25, which is, in turn, connected to a residue receiver 26 and a distillate receiver 27. In addition, two successive cold traps 28, 29 are connected to the short-path evaporator or vaporizer 25. Between the cold traps 28, 29 there is provided a Roots pump 31 and following the second cold trap there is provided a Roots pump 32 and then a rotary vane pump 33.

The residue or residue fraction of the vacuum rectification stage introduced into the feed vessel 21 is fed by means of the pump 23 through the line 24 into the short-path evaporator or vaporizer 25, where it is separated by evaporation or vaporization into a distillate or distillate fraction and a residue or residue fraction separately collected in the respective receivers 26 and 27. It is here parenthetically remarked that a small amount of possibly present highly volatile components, which can be formed as a result of thermal decomposition in the short-path evaporator or vaporizer 25, are separately collected in the cold traps 28, 29.

The heating temperatures in the inventive thin-film short-path distillation process can be above the temperatures given in the following described embodiments, preference being given to 400° C. or even higher temperatures.

The invention will now be still further explained based upon the following illustrative Examples:

EXAMPLE 1

The residue from the vacuum distillation stage not distillable up to a temperature of 530° C. (temperature related to normal pressure) was supplied to a so-called SAMVAC thin-film short-path distillation plant or installation of the assignee Buss AG, located at Basel, Switzerland, and having the following operating data:

| Feed | 13.1 kg/h |
|---|---|
| Pressure | 4.5 $10^{-2}$ mbar |
| Heating temperature | 351° C. |
| Cooling temperature | 103° C. |
| Distillate speed | 6.5 kg/h |
| Distillate fraction | 49.6% |

By means of a pump, the residue or residue fraction was continuously supplied to the intake or inlet of an evaporator or vaporizer and uniformly distributed over the inner surface using a rotary distributor ring. The rotor wiping or wiper blades moving along the evaporation or vaporization surface then engage the material and supply the heating surface with a turbulent film. A bow wave is formed in front of the rotor wiping or wiper blades It was possible to significantly increase the throughput and distillate quantities by raising the heating temperature, which is in particular due to the evaporation or vaporization of higher molecular weight substances or materials.

The results of further examples are summarized hereinafter. Examples 1 to 5 were performed with a view to increasing the distillate fraction, Examples 6 to 10 with a view to increasing the feed rate.

|  | Example | | | |
|---|---|---|---|---|
|  | 2 | 3 | 4 | 5 |
| Feed | | | | |
| Feed rate kg/h | 21.5 | 26.7 | 15.5 | 13.8 |
| Storage vessel temperature °C. | 201 | 205 | 206 | 205 |
| Feed line temperature °C. | 175 | 189 | 183 | 320 |
| Concentrate | | | | |
| Discharge velocity kg/h | 13.45 | 17.9 | 8.5 | 7.27 |
| Distillate | | | | |
| Discharge velocity kg/h | 8.05 | 8.8 | 7.0 | 6.53 |
| Vacuum mbar | $4 \times 10^{-2}$ | $4 \times 10^{-2}$ | $3.5 \times 10^{-2}$ | $5 \times 10^{-2}$ |
| Heating medium inlet °C. | 332 | 329 | 333 | 350 |
| Heating medium outlet °C. | 312 | 313 | 319 | 333 |
| Cooling medium inlet °C. | 93 | 95 | 95 | 103 |
| Cooling medium outlet °C. | 94 | 96 | 97 | 105 |
| Distillate fraction % | 37.4 | 33.0 | 45.2 | 47.4 |

| Example No. | Heating temperature °C. | Distillate as % of feed | Feed rate kg/h |
|---|---|---|---|
| 6 | 364 | 59 | 21.3 |
| 7 | 371 | 56 | 39.6 |
| 8 | 374 | 61 | 24.3 |
| 9 | 386 | 63 | 39.7 |
| 10 | 394 | 61.5 | 51.3 |

These tests revealed that it is readily possible to readily achieve flow rates of 225 kg/h m², which ensures economic use on the refinery scale.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A process for the further processing of a residue left behind during vacuum distillation in a crude oil refinery comprising the step of
   subjecting the crude oil vacuum distillation residue to thin-film short-path distillation under vacuum at an evaporator surface in order to obtain a distillate and concentrated residue; said step entailing the passing of the crude oil vacuum distillation residue in the form of thin film along the evaporator surface in contact therewith, wherein the evaporator surface is heated to a temperature appreciably higher than the temperature of the crude oil vacuum distillation residue left behind during vacuum distillation and wherein the distillation residue is subjected to the combined action of vaporization and the thermal decomposition at the heated evaporator surface.

2. The process as defined in claim 1, wherein:
   the temperature of the evaporator surface is at least 50° C. higher than the temperature of the residue left behind during vacuum distillation.

3. The process as defined in claim 1, wherein:
   the temperature of the evaporator surface is at least 80° C. higher than the temperature of the residue left behind during vacuum distillation.

4. The process as defined in claim 1, wherein:
   the temperature of the evaporator surface is at least 100° C. higher than the temperature of the residue left behind during vacuum distillation.

5. The process as defined in claim 1, wherein:
   the residue which is to be subjected to the thin-film short-path distillation is in the form of a turbulent thin film.

6. The process as defined in claim 5, further including the step of:

utilizing mechanical means to render said thin film turbulent.

7. The process as defined in claim 6, wherein:
there are utilized as the mechanical means wiper blades to render said thin film turbulent.

8. The process as defined in claim 1, wherein: there is processed as said residue which is to be subjected to thin-film short-path distillation a residue which is left behind during vacuum distillation and which has a boiling point above 550° C. at normal pressure.

9. The process as defined in claim 1, wherein:
the thin-film short-path distillation under vacuum of the residue takes place at an absolute pressure in the range of 10 mbar and $10^{-3}$ mbar.

10. The process as defined in claim 9, wherein: there is selected as said absolute pressure an absolute pressure in the range of about 1 to about 0.01 mbar.

11. The process as defined in claim 1, wherein:
there is obtained as said distillate a distillate substantially free from asphalts.

12. The process as defined in claim 1, wherein: wherein:
said step of subjecting the residue to the thin-film short-path distillation entails processing said residue in several apparatuses which are connected in parallel with respect to one another, each of which is connected with a vacuum plant.

13. The process as defined in claim 1, further including the step of:
heating the evaporator surface to a heating temperature above 350° C.

14. The process as defined in claim 13, wherein:
the evaporator surface is heated to a heating temperature above 400° C.

15. The process as defined in claim 1, further including the step of:
feeding the residue and a heating medium for heating the evaporator surface in counter-current relationship with each other.

16. The process as defined in claim 1, wherein:
the thin-film short-path distillation takes place with a rising temperature.

17. The process as defined in claim 1, wherein:
the thin-film short-path distillation takes place with a substantially constant pressure course.

* * * * *